(12) United States Patent
Drewes et al.

(10) Patent No.: US 10,330,085 B2
(45) Date of Patent: Jun. 25, 2019

(54) TOWER FOR A WIND TURBINE

(71) Applicants: THYSSENKRUPP STEEL EUROPE AG, Duisburg (DE); thyssenkrupp AG, Essen (DE)

(72) Inventors: Stephan Drewes, Mönchengladbach (DE); Mark Hirt, Bochum (DE); Lothar Patberg, Moers (DE); Adrian Paton, Dinslaken (DE); Patrick Tlauka, Oberhausen (DE)

(73) Assignee: thyssenkrupp AG, Essen (DE)

( * ) Notice: Subject to any disclaimer, the term of this patent is extended or adjusted under 35 U.S.C. 154(b) by 0 days.

(21) Appl. No.: 15/760,304

(22) PCT Filed: Sep. 8, 2016

(86) PCT No.: PCT/EP2016/071186
§ 371 (c)(1),
(2) Date: Mar. 15, 2018

(87) PCT Pub. No.: WO2017/045993
PCT Pub. Date: Mar. 23, 2017

(65) Prior Publication Data
US 2018/0266396 A1    Sep. 20, 2018

(30) Foreign Application Priority Data
Sep. 16, 2015 (DE) .......... 10 2015 115 634

(51) Int. Cl.
*F03D 13/20* (2016.01)
*E02B 17/00* (2006.01)
(Continued)

(52) U.S. Cl.
CPC .......... *F03D 13/20* (2016.05); *E02B 17/0004* (2013.01); *E04H 12/08* (2013.01);
(Continued)

(58) Field of Classification Search
CPC .......... F03D 13/20; E04H 12/10; E04H 12/08; E04H 2012/006; F05B 2230/30; F05B 2230/60; F05B 2240/9121
See application file for complete search history.

(56) References Cited

U.S. PATENT DOCUMENTS 3,204,721 A    9/1965  Park
3,812,771 A *  5/1974  Yokoyama .............. E04H 12/28
                                                    454/1
(Continued)

FOREIGN PATENT DOCUMENTS

CN           102536681 A      7/2012
DE    10 2005 047 961 A      4/2007
(Continued)

OTHER PUBLICATIONS

English language Abstract for RU 2378468 C1.
(Continued)

*Primary Examiner* — Adriana Figueroa
(74) *Attorney, Agent, or Firm* — RMCK Law Group PLC

(57) ABSTRACT

A tower for a wind turbine may include an upper tower portion and a lower tower portion. The upper tower portion may include a tubular tower, and the lower tower portion may include a lattice tower. To improve ergonomics and work safety and make it possible to obtain a structural design with optimized forces, the lower tower portion may include a central tube positioned centrally within the lattice tower. Further, the central tube may have a smaller diameter, at least in certain portions, than at least part of the tubular tower of the upper tower portion. The tower may also include a transition piece between the upper tower portion and the lower tower portion. The transition piece may join the tubular tower of the upper tower portion and the central tube of the lower tower portion.

17 Claims, 2 Drawing Sheets

(51) Int. Cl.
  *E04H 12/08*  (2006.01)
  *E04H 12/10*  (2006.01)
  *E04H 12/00*  (2006.01)

(52) U.S. Cl.
  CPC ...... *E04H 12/10* (2013.01); *E02B 2017/0091* (2013.01); *E04H 2012/006* (2013.01); *F05B 2230/30* (2013.01); *F05B 2230/60* (2013.01); *F05B 2240/913* (2013.01); *F05B 2240/9121* (2013.01); *Y02E 10/728* (2013.01); *Y02P 70/523* (2015.11)

(56) References Cited

U.S. PATENT DOCUMENTS

| | | | | |
|---|---|---|---|---|
| 4,295,317 | A | | 10/1981 | Vantielen |
| 4,403,916 | A | * | 9/1983 | Skelskey ............... F03D 7/0212 416/14 |
| 4,824,291 | A | * | 4/1989 | Coppens ................. E02B 17/00 405/204 |
| 6,299,385 | B1 | * | 10/2001 | Barnes .................. E02B 17/021 405/195.1 |
| 7,735,290 | B2 | * | 6/2010 | Arsene .................... F03D 13/20 52/651.01 |
| 7,993,107 | B2 | * | 8/2011 | Gevers .................... F03D 13/10 416/244 R |
| 8,511,940 | B2 | * | 8/2013 | Hall ........................ E02D 27/42 405/195.1 |
| 9,617,752 | B2 | * | 4/2017 | Wagner ................... F03D 13/20 |
| 2006/0115364 | A1 | * | 6/2006 | Hall ....................... E02B 17/027 416/244 R |
| 2006/0237600 | A1 | * | 10/2006 | Hall ........................ E02B 17/00 248/188.7 |
| 2007/0243063 | A1 | * | 10/2007 | Schellstede ............. E02D 27/42 416/10 |
| 2010/0077693 | A1 | | 4/2010 | Cheynet de Beaupre |
| 2013/0283722 | A1 | * | 10/2013 | Kyatham ............... F03D 13/20 52/651.07 |
| 2015/0218840 | A1 | | 8/2015 | Paton et al. |

FOREIGN PATENT DOCUMENTS

| | | | |
|---|---|---|---|
| DE | 10 2012 106 772 A | | 1/2014 |
| DE | 102012112415 A | | 6/2014 |
| DE | 10 2013 221 681 A | | 4/2015 |
| DE | 20 2015 103 351 U | | 7/2015 |
| EP | 2369179 A | | 9/2011 |
| EP | 2597227 A | | 5/2013 |
| FR | 2597161 A1 | * | 10/1987 ............ F03D 13/20 |
| GB | 978678 A | | 12/1964 |
| KR | 101461146 B | | 11/2014 |
| RU | 2378468 C1 | | 1/2010 |
| WO | 2005021897 A | | 3/2005 |

OTHER PUBLICATIONS

English Translation of International Search Report issued in PCT/EP2016/071186, dated Sep. 8, 2016 (mailed Sep. 16, 2015).
Wächter des Meeres; Serie: Die Leuchtfeuer des Nordens—3. Teil; Ostfrieslands Eiffelturm. In: Ostfriesland Magazin (Aug. 2005), pp. 1-16 (www.wsv.de/wsaemd/download/OMAG_2006-08-Waechter_d_Meere-LF Campen.pdf). [[No English translation available]].

* cited by examiner a) b)

a) b) c)

TOWER FOR A WIND TURBINE

CROSS REFERENCE TO RELATED APPLICATIONS

This application is a U.S. National Stage Entry of International Patent Application Serial Number PCT/EP2016/071186, filed Sep. 8, 2016, which claims priority to German Patent Application No. DE 10 2015 115 634.2, filed Sep. 16, 2015, the entire contents of both of which are incorporated herein by reference.

FIELD

The present disclosure generally relates to wind turbines, including towers for wind turbines.

BACKGROUND

The trend, especially for wind turbines or wind energy plants, particularly in the onshore area, is toward increasingly taller hub heights (the height at which the hub of the wind rotor is situated above the ground surface). Meanwhile, heights beyond 100 m are desirable here. In this way, higher and more constant wind speeds could be utilized and thus the efficiency of the wind turbine will be improved, especially in low wind areas.

But taller towers with larger and more powerful generators or rotors at the same time mean that the wall thicknesses and the diameters of the tower segments must be larger in order to meet the resulting greater demands of structural mechanics, such as rigidity, buckling resistance, and fatigue strength.

The problem here is, however, that, for logistical and transportation reasons, the transport of corresponding tower segments is no longer possible, due to restrictions such as bridge clearance height, when the dimensions of the individual tower segments are increased because of taller towers.

For this reason, towers of the kind mentioned above for wind turbines have been proposed in the prior art. Thus, for example, WO 2005/021897 A1 describes a tower with an upper tubular tower portion and a lower tower portion designed as a lattice tower.

However, it turns out that considerable drawbacks occur with such designs in terms of ergonomics and work safety, since in particular the accessibility of individual parts of the tower may be significantly impaired on account of the lattice construction in the lower tower portion. Furthermore, it turns out that the structural design of the lattice tower may be costly in such a hybrid design, since it must be designed to withstand large forces. This may lead to high expense and high costs.

Thus a need exists for a tower for wind turbines and a wind turbine that afford on the one hand an improved ergonomics and work safety and on the other hand make possible a structural design with optimized forces.

BRIEF DESCRIPTION OF THE FIGURES

FIG. 1a is a longitudinal sectional view of an example tower.

FIG. 1b is a cross-sectional view of the example tower of FIG. 1a.

FIG. 3a is a perspective view of part of a further example tower.

FIG. 3b is an enlarged partial-cutout view of the example tower of FIG. 3a.

FIG. 3c is an enlarged partial-cutout view of the example tower of FIG. 3a.

DETAILED DESCRIPTION

Figure 1:
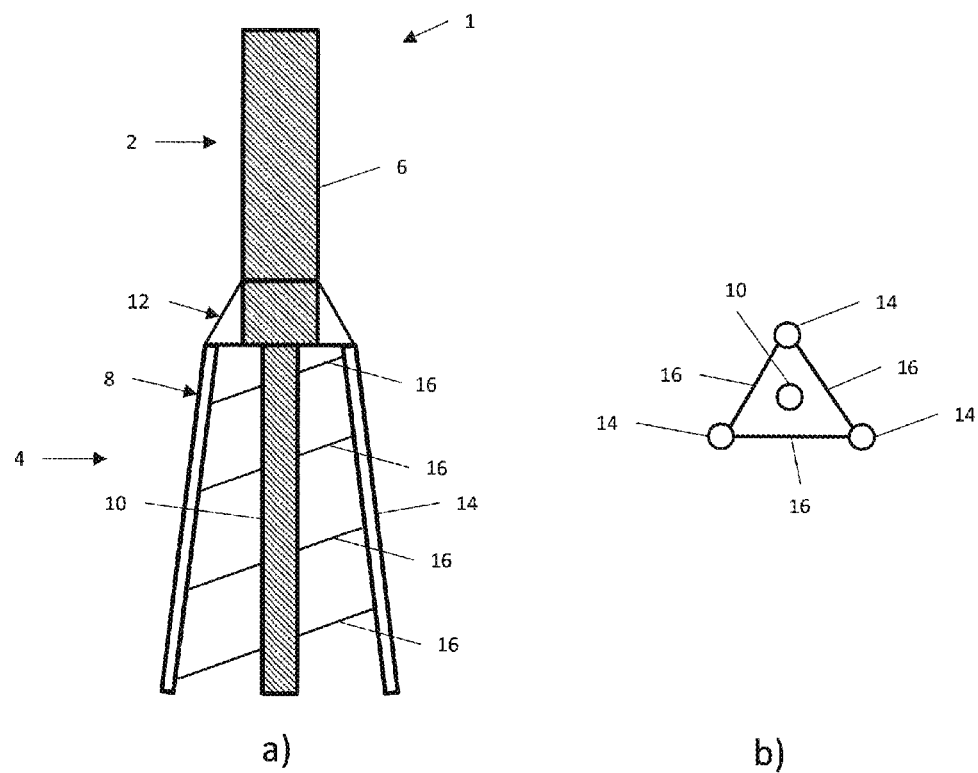

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a tower for a wind turbine. In some examples, such a tower may include an upper tower portion and a lower tower portion. The upper tower portion may comprise a tubular tower, and the lower tower portion may comprise a lattice tower. The present disclosure furthermore relates to wind turbines.

To overcome the problems discussed in the prior art, in some examples the lower tower portion comprises a central tube arranged centrally within the lattice tower, wherein the central tube has a smaller diameter, at least in certain portions, than at least part of the tubular tower of the upper tower portion.

Because the lower tower portion comprises a lattice tower, first of all it is possible to reach tall hub heights beyond 100 m. But at the same time a central tube is provided inside the lattice tower, having at least for a portion a smaller diameter than at least part of the tubular tower of the upper tower portion. This accomplishes the benefits of a continuous tubular tower, in particular an easier accessibility of the wind turbine being possible through this central tube. Yet the smaller diameter specifically avoids the drawbacks of a usual continuous tubular tower, in that the diameter of the tubular tower segments in the lower region of such tower heights normally makes the transport more difficult. Instead, it has been realized that a central tube whose diameter is smaller at least for a portion than at least part of the tubular tower is already sufficient to achieving the necessary ergonomics and at the same time optimizing the flow of forces in the tower. As a result, the invention combines the benefits of a lattice construction and a tubular tower in the lower tower portion, yet without having to suffer the respective drawbacks.

Preferably the central tube of the lower tower portion has a smaller diameter substantially over its entire length than at least part of the tubular tower, for example, than at least the lower part or also the entire tubular tower.

The central tube of the lower tower portion is preferably disposed in a prolongation of the tubular tower of the upper tower portion. The longitudinal axes of the central tube and the tubular tower preferably lie on one another.

The tower is preferably designed for a hub height of more than 100 m. At such heights, the properties of a tower according to the invention, that is, improved ergonomics and an improved flow of forces, are especially advantageous.

Preferably the upper tower portion comprising the tubular tower is free of a lattice tower surrounding the tubular tower. It has been found that a sufficient stability can be achieved in the upper tower portion without an additional lattice structure surrounding the tubular tower.

The central tube is formed in particular as a hollow profile. The central tube is preferably built in a sheet metal construction. This allows an optimal adaptation and a light and economical construction as compared to cast metal parts, for example. Individual parts of the central tube may be welded together in particular.

According to one embodiment of the tower according to the invention, the tower furthermore comprises a transition piece between the upper and the lower tower portion and preferably the tubular tower of the upper tower portion and the central tube of the lower tower portion are joined together across the transition piece. By providing a transition piece, a further optimized and load-adapted transition can be achieved between the upper tower portion, especially the tubular tower of the upper tower portion, and the lower tower portion, especially the central tube of the lower tower portion. The transition piece may serve first of all as the connection between tubular tower and central tube. At the same time, the transition piece may also serve for attaching the lattice tower to the tubular tower of the upper tower portion. As a result, the transition piece may therefore also serve for attaching the central tube to the lattice tower. Thus, the transition piece preferably comprises attachment areas for the tubular tower, the central tube and the lattice tower. The transition piece thus constitutes in particular a kind of central node.

It is conceivable to form the transition piece, or portions thereof, integrated with the tubular tower, the central tube and/or the transition piece. Preferably, however, the transition piece is formed as a separate component, which is connected to the other elements, in particular, welded and/or bolted.

Also the transition piece is preferably of sheet metal construction. As already mentioned, this allows on the one hand a flexible production and a light and economical design as compared to cast metal parts, for example. Individual sheet metal pieces may then be connected to the transition piece by welding them together.

According to another embodiment of the tower according to the invention, the central tube of the lower tower portion is joined at its lower end to a foundation of the tower and at its upper end to the transition piece. This accomplishes in especially simple fashion a contributing of the central tube to an improved flow of forces and a relieving of the load on the lattice tower. Furthermore, the access of workers from the ground up to the upper tower portion can be facilitated through the central tube.

According to another embodiment of the tower according to the invention, the central tube of the lower tower portion is designed to absorb forces from the upper tower portion, especially to absorb torsional forces. As already mentioned, this can accomplish an optimized flow of forces and an optimized load distribution, since the central tube takes over a structural load component and in particular the lattice tower, especially its corner posts, is/are relieved of load. Which forces of which magnitude the central tube can absorb may then be adjusted in particular by the wall thickness and the diameter.

According to another embodiment of the tower according to the invention, the lattice tower of the lower tower portion comprises at least three, preferably precisely three corner posts. It has been found that by designing the lattice tower with three corner posts in particular a simple and scalable structural design is possible using standard profiles, with good stability at the same time. With three corner posts, the base surface or cross section area of the lattice tower accordingly has a triangular area. However, the lattice tower may also be designed with a larger number of corner posts, for example four or five corner posts may be provided. The base surface or cross section area is then a corresponding polygon. The number of corner posts in particular can be made dependent on the hub height, the power, and the weight to be supported by the tower.

The corner posts for example consist of individual corner post segments, for example, tubular hollow profiles. For example, several hollow profiles can form one corner post. The individual hollow profiles may be joined together in their end regions by means of screws, for example. Preferably between the corner posts there are transverse and/or diagonal braces, which join together neighboring corner posts.

According to another embodiment of the tower according to the invention, the diameter of the central tube for at least a portion amounts to at least 1 m, preferably at least 1.5 m, and/or at most 4 m, preferably at most 3.5 m, especially preferably at most 1.8 m.

If a smaller diameter of the central tube is chosen (such as 1.5 m to 1.8 m), the minimum requirements for ergonomics and work safety can be met. On the other hand, if larger diameters are chosen (such as 1.8 to 3.5 m), the central tube can absorb forces (especially torsional forces) especially effectively and relieve the load on the lattice tower. Furthermore, it is then possible for the central tube to house even larger components, such as a transformer unit.

According to another embodiment of the tower according to the invention, the lower tower portion is formed free of load-bearing connections between the lattice tower and the central tube. This holds especially for connections between corner posts of the lattice tower and the central tube. That is, either no connections at all are provided between the central tube on the one hand and the lattice tower (or its corner posts) on the other hand, or at least no load-bearing connections are provided. But in the latter case, non-load-bearing braces or webs may be provided, for example. These can further improve the accessibility of the tower to workers.

According to another embodiment of the tower according to the invention, the lower tower portion comprises access facilities in or on the central tube, especially an elevator, a ladder and/or assembly platforms, and/or electrical components, especially lines and/or electrical components.

In particular, the central tube may serve as a housing or enclosure for such devices or components. In this way, almost regardless of the construction of the tower in the lower tower portion, i.e., especially if a lattice structure is provided, a simple and safe accessibility for workers and/or a secure housing of corresponding components is achieved.

According to another embodiment of the tower according to the invention, the central tube has one or more hatches, wherein at least some of the hatches are connected in particular by non-load-bearing connections to the lattice tower, especially corner posts of the lattice tower. By providing the hatches, the ergonomics and work safety of the tower are further improved, since workers can reach a particular height for assembly or servicing work, for instance, through the central tube and then leave the central tube through the hatches in order to reach other areas of the tower. For example, a first hatch is provided near the ground in the central tube. Further hatches may be spaced apart from each other, for example, at given heights. At the height of the corresponding hatches, furthermore, assembly cages may be provided at least in part on the central tube and/or on the lattice tower.

According to another embodiment of the tower according to the invention, the transition of the diameter from the tubular tower of the upper tower portion to the central tube of the lower tower portion is continuous and/or steplike in a transitional region.

For example, the transitional region may be formed by the central tube. In this case, the transitional region then preferably lies at the upper end of the central tube. However, it is likewise conceivable for the transitional region to be formed at least in part by the transition piece. Preferably, however, the transition piece has substantially the diameter of the tubular tower of the upper tower portion.

For example, the central tube has at its upper end a substantially constant diameter, so that the transition is steplike. For example, the central tube has at its upper end a conical section with a diameter increasing continuously in the direction of the upper tower portion. For example, the diameter increases up to the diameter of the tubular tower or the transition piece.

According to another embodiment of the tower according to the invention, the lower tower portion has a height of at least 60 m, preferably at least 80 m and/or a height of at most 140 m. A preferred range of height of the lower tower portion is 80 m to 100 m, for example. In order to achieve tall hub heights of around 200 m, however, a preferred range of 120 m to 140 m for the height of the lower tower portion can also be provided. Depending on the location and the technology, greater heights are also possible. It has been found that for lattice towers in this height range the described design with a central tube is advantageous in regard to better ergonomics and work safety and a possible relieving of the load on the lattice tower.

According to another embodiment of the tower according to the invention, the lattice tower of the lower tower portion comprises lattice elements, which are joined together at least partly by connection elements, especially screws, preferably HR screws, or bolts, preferably locking ring bolts. However, it is also conceivable to use other connection elements to produce form fitting connections. Such lattice elements are, for example, corner posts, cross braces and/or diagonal braces. By the use of HR screws, that is, high-strength, specifically preloaded screw connections, it is possible to do without individually certified clamping connections (such as locking latch bolts) in particular. This is made possible in that the central tube affords better access possibilities during the assembly and during later inspections.

According to another embodiment of the tower according to the invention, the central tube is welded for at least a portion by a spiral seam and/or lengthwise seam. With spiral-seam welded tubes, an almost continuous process can make possible an economical production. With lengthwise-seam welded tubes, greater wall thicknesses and diameters can be processed and a good stability can be achieved, in particular.

According to another embodiment of the tower according to the invention, the tubular tower of the upper tower portion is formed in a transversely oriented design. Since the tubular tower starts only in the upper tower portion and does not need to reach from the ground to the total height of the tower, the tubular tower can have a correspondingly small diameter and the individual tubular tower segments can be provided in transversely oriented design, without this impairing the transport. By a transversely oriented design is meant in particular that the tower is built from elements running transversely to the run of the tower (lengthwise direction).

According to another teaching of the present invention, the problem mentioned at the outset is also solved by a wind turbine with a tower according to the invention. A wind turbine comprises in particular a machine housing (also known as a pod) fastened on the tower and a rotor with rotor blades. For this, the tubular tower of the upper tower portion may have an adapted fastening area at its upper ends.

FIG. 1a shows a longitudinal section of a first sample embodiment of a tower according to the invention, while FIG. 1b shows a cross section of the sample embodiment of FIG. 1a.

The tower 1 is part of a wind turbine with pod and rotor (not shown). The tower 1 comprises an upper tower portion 2 and a lower tower portion 4. The upper tower portion 2 comprises a tubular tower 6. The lower tower portion 4 comprises a lattice tower 8 and a central tube 10, which is disposed centrally inside the lattice tower 8. The central tube 10 has a smaller diameter throughout than the tubular tower 6 of the upper tower portion 2. The tower 1 furthermore comprises a transition piece 12, by which the lattice tower 8, the central tube 10 and the tubular tower 6 are joined together. The central tube 10 is connected at its lower end to a foundation (not shown) of the tower 1 and at its upper end to the transition piece 12.

The central tube 10 of the lower tower portion 4 is designed by virtue of the wall thickness and the diameter to absorb forces from the upper tower portion 2. In this way, the central tube 10 relieves the load on the lattice tower 8. Furthermore, the central tube 8 in this case constitutes a housing for a ladder.

The lattice tower 8 of the lower tower portion 4 here comprises three corner posts, of which two corner posts 14 can be seen in FIG. 1a. The lattice tower furthermore comprises cross braces and/or diagonal braces 16, which are arranged between the corner posts 14. The lower tower portion 4 is thus designed free of load-bearing connections between the lattice tower 8 and the central tube 10.

Figure 2:
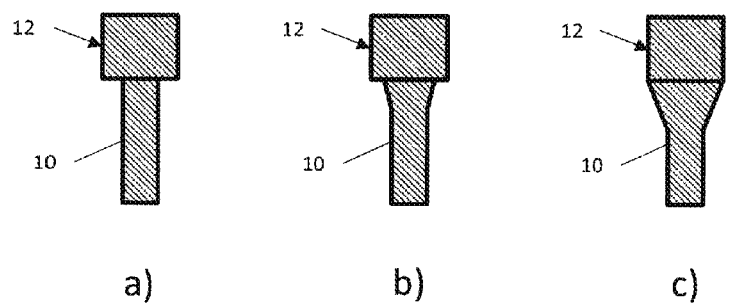
FIG. 2a is a longitudinal sectional view of an example transitional region of a tower.
FIG. 2b is a longitudinal sectional view of another example transitional region of a tower.
FIG. 2c is a longitudinal sectional view of still another example transitional region of a tower.

FIG. 2a-c shows different variants of the transitional region from the central tube 10 to the transition piece 12. FIG. 2a shows, as already represented in FIG. 1a, an exclusively steplike transition, FIG. 2b shows a combined steplike and continuous transition, and FIG. 2c finally shows a continuous transition without step. For the (partly) continuous transition (FIG. 2b, c), the central tube 10 has an enlarging diameter at its upper end.

Figure 3:
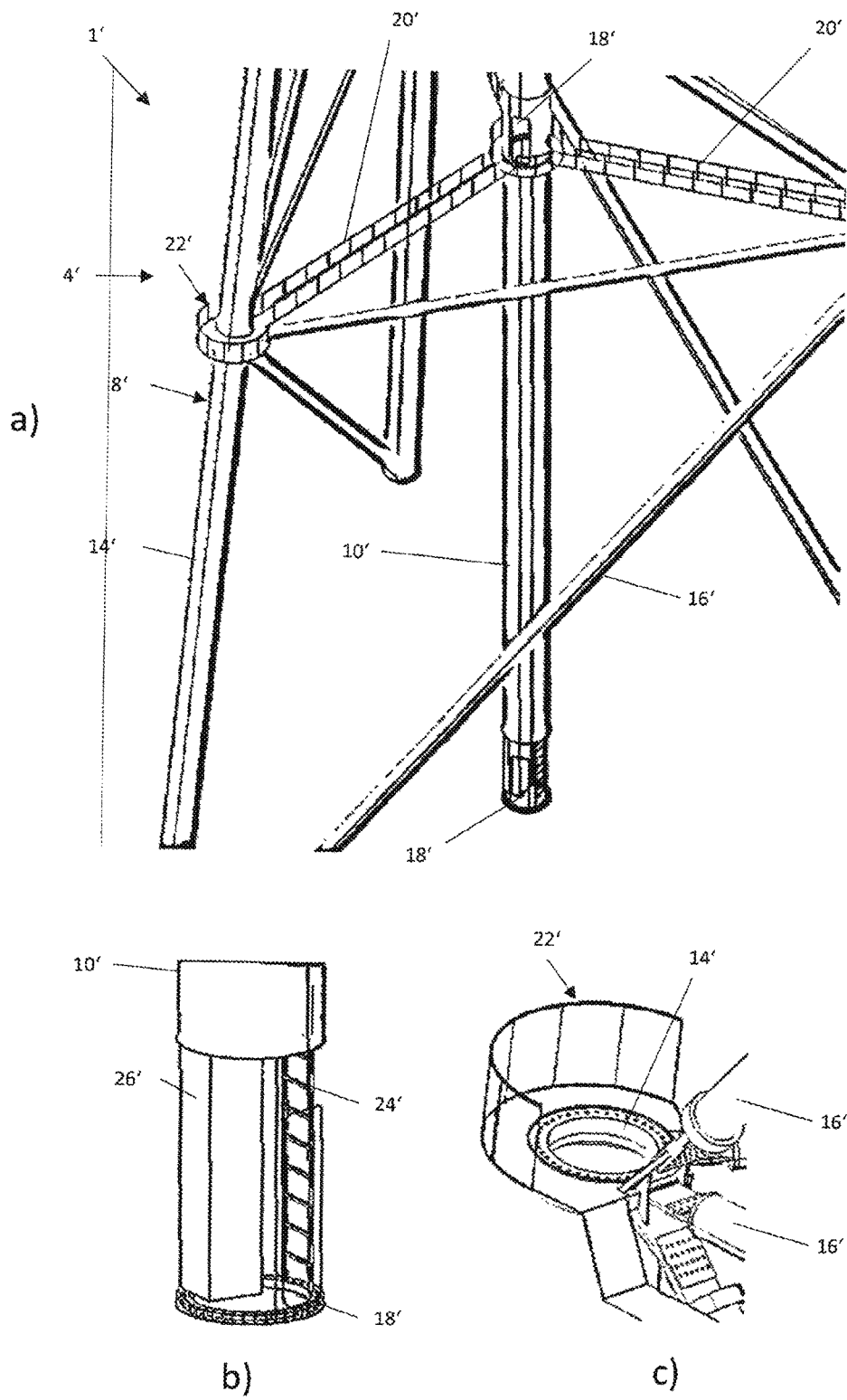

FIG. 3a shows a perspective view of part of another sample embodiment of a tower according to the invention. The construction corresponds basically to that already described in connection with FIG. 1. In contrast with this, the central tube 10' of the tower 1' partially shown in FIG. 3a comprises several hatches 18', the hatches being connected in part by non-load-bearing connection webs 20' to the lattice tower 8' and especially here to the corner posts 14' of the lattice tower 8'. Furthermore, assembly platforms 22' are provided both on the central tube 10' and on the corner posts 14'.

FIG. 3b shows an enlarged (semi-transparent) view of the hatch 18' in the lower area of the central tube 10'. As can be seen, a ladder 24' and an electrical component, such as a service elevator 26', can be housed in the central tube 10'.

FIG. 3c furthermore shows an enlarged view of the assembly platform 22' at the corner post 14'. As can be seen, HR screw connections may be used in order to connect the individual braces 16' of the lattice tower 8' to the corner post 14'. Thanks to the central tube 10' and the connection webs 20', these attachment areas can be reached with good ergonomics and work safety.

What is claimed is:

1. A tower for a wind turbine comprising:
   an upper tower portion that includes a tubular tower; and
   a lower tower portion that includes a lattice tower and a central tube disposed centrally within the lattice tower, wherein the lower tower portion is free of load-bearing connections between the lattice tower and the central tube, wherein at least one portion of the central tube has a smaller diameter than at least one portion of the upper tower portion, wherein the lattice tower of the lower tower portion comprises at least three corner posts, wherein the lattice tower comprises cross braces and/or diagonal braces that are disposed between the corner posts and join together adjacent corner posts, wherein the lower tower portion comprises access facilities in or on the central tube, wherein the central tube comprises a hatch that is connected by a non-load-bearing connection to the lattice tower.

2. The tower of claim 1 wherein at least two portions of the central tube have a smaller diameter than the at least one portion of the upper tower portion.

3. The tower of claim 1 comprising a transition piece disposed between the upper tower portion and the lower tower portion, wherein the transition piece joins the tubular tower of the upper tower portion and the central tube of the lower tower portion.

4. The tower of claim 3 wherein a lower end of the central tube of the lower tower portion is joined to a foundation of the tower, wherein an upper end of the central tube of the lower tower portion is joined to the transition piece.

5. The tower of claim 1 wherein the central tube of the lower tower portion absorbs forces from the upper tower portion.

6. The tower of claim 1 wherein the lattice tower of the lower tower portion includes exactly three corner posts.

7. The tower of claim 1 wherein a diameter of the at least one portion of the central tube is at least 1 meter.

8. The tower of claim 7 wherein a diameter of the at least one portion of the central tube is at most 4 meters.

9. The tower of claim 1 wherein the access facilities comprise at least one of an elevator, an assembly platform, or an electrical component.

10. The tower of claim 1 wherein with respect to diameter a transition from the tubular tower of the upper tower portion to the central tube of the lower tower portion is continuous.

11. The tower of claim 1 wherein with respect to diameter a transition from the tubular tower of the upper tower portion to the central tube of the lower tower portion is step-like.

12. The tower of claim 1 wherein the lower tower portion has a height of at least 60 meters.

13. The tower of claim 1 wherein the lattice tower comprises lattice elements that are joined together at least partly by connection elements, wherein the connection elements comprise at least one of HR screws or locking ring bolts.

14. The tower of claim 1 wherein at least a portion of the central tube is welded by a spiral seam or a lengthwise seam.

15. The tower of claim 1 wherein the non-load-bearing connection includes a connection web extending between the central tube and a corner post.

16. A wind turbine with a tower that comprises:
    an upper tower portion that includes a tubular tower; and
    a lower tower portion that includes a lattice tower and a central tube disposed centrally within the lattice tower, wherein the lower tower portion is free of load-bearing connections between the lattice tower and the central tube, wherein at least one portion of the central tube has a smaller diameter than at least one portion of the upper tower portion, wherein the lattice tower of the lower tower portion comprises at least three corner posts, wherein the lattice tower comprises cross braces and/or diagonal braces that are disposed between the corner posts and join together adjacent corner posts, wherein the lower tower portion comprises access facilities in or on the central tube, wherein the central tube comprise a hatch that is connected by a non-load-bearing connection to the lattice tower.

17. The wind turbine of claim 16 wherein the non-load-bearing connection includes a connection web extending between the central tube and a corner post.

* * * * *